No. 764,270. Patented July 5, 1904.

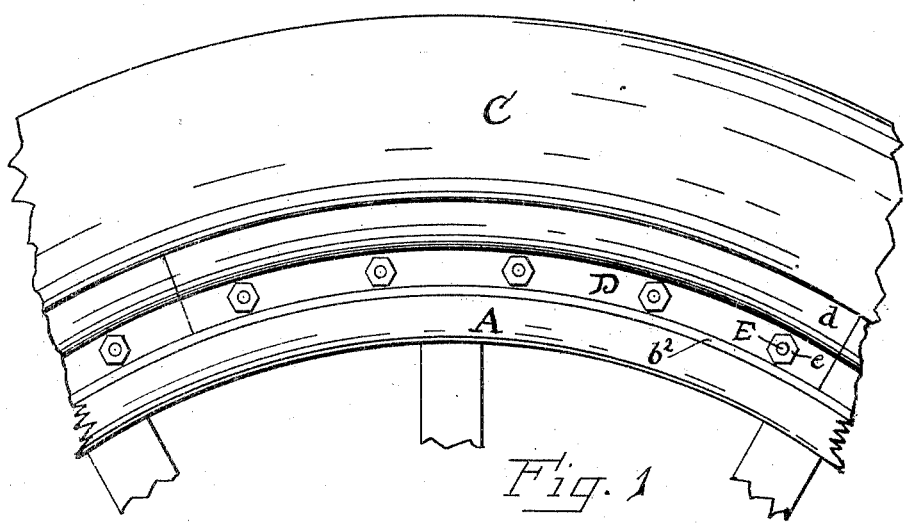
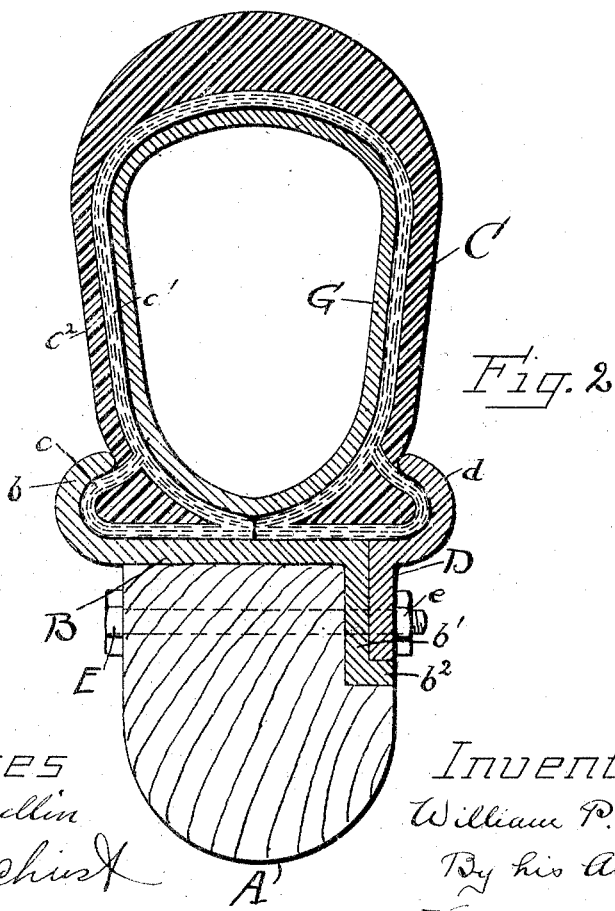

UNITED STATES PATENT OFFICE.

WILLIAM P. CRONIN, OF BOSTON, MASSACHUSETTS, ASSIGNOR TO THE DIAMOND RUBBER COMPANY, OF AKRON, OHIO, A CORPORATION OF WEST VIRGINIA.

VEHICLE-TIRE.

SPECIFICATION forming part of Letters Patent No. 764,270, dated July 5, 1904.

Application filed March 21, 1904. Serial No. 199,058. (No model.)

*To all whom it may concern:*

Be it known that I, WILLIAM P. CRONIN, a citizen of the United States, residing at Boston, in the county of Suffolk and State of Massachusetts, have invented a certain new and useful Improvement in Vehicle-Tires, of which the following is a full, clear, and exact description, reference being had to the accompanying drawings.

The object of this invention is to provide a very simple and efficient means for holding a pneumatic tire to the rim of the wheel and allowing its easy removal for repairs. The securing means is applied to the clencher type of tire.

It consists of a separable rim having a stationary part which surrounds and is secured to the wheel-felly and has a reëntrant edge flange adapted to take over one edge rib on the tire and a removable part having also a reëntrant edge flange for the other edge rib of the tire.

The invention may be conveniently summarized as consisting of a combination of parts hereinafter more fully described, and definitely set out in the claim.

The drawings clearly disclose my invention, Figure 1 being the portion of the side of a wheel to which my tire is applied, and Fig. 2 being a cross-section through the tire and wheel-rim.

As shown in the drawings, A represents the felly. Resting on the periphery of this felly is a metal rim-plate B, and seating on this is the outer tire C. This tire is of the clencher type and has along each outer edge an outwardly-extending rib $c$. The tire is shown as composed of canvas $c'$ and rubber $c^2$ in the usual manner.

G represents an inner tube within the outer tire or sheath C.

To hold the tire in place, I provide metal edge flanges on the rim which are curled to point inward or be reëntrant and are thus adapted to extend over the ribs $c$. As shown in the drawings, one of these edge flanges $b$ is made integral with the rim B. The other edge flange $d$ is on a separate plate D. The two portions B and D of the rim are thus separable to allow the easy removal of the tire.

As shown in the drawings, the rim portion B has a flange $b'$ extending radially inward and seating in a recess in the felly, and at the base of this flange is a laterally-extending rib $b^2$. These parts are seated within a cut-away portion of the felly. The flange $b'$ and rib $b^2$ make a very efficient seat for the plate D. The two parts of the rim are held together by suitable means, as the bolt E, which is shown as passing through the felly and through the flange $b'$ and plate D and having on its end a nut $e$. This arrangement securely holds the parts in place. At the same time the rim-piece D or any section of it, if it is made in several longitudinal sections, may be removed to allow the removal of the tire. Thereafter when this rim-piece D is returned it is sure to go into exact position.

I claim—

The combination of a wheel-felly and a two-part rim resting thereon and secured thereto consisting of one member having a curled edge for engagement with the bead of the tire, and having an inwardly-extending flange which is arranged to engage upon one side of the felly, and a plurality of segmental plates having curled edges arranged to take over the other bead of the tire and having plate portions which are arranged to be clamped against said flange, all of said plates being adapted to form a ring.

In testimony whereof I hereunto affix my signature in the presence of two witnesses.

WILLIAM P. CRONIN.

Witnesses:
W. T. HELFER,
M. H. COULTER.